United States Patent
Wei et al.

(10) Patent No.: US 9,146,423 B2
(45) Date of Patent: Sep. 29, 2015

(54) PIXEL STRUCTURE

(71) Applicant: Au Optronics Corporation, Hsinchu (TW)

(72) Inventors: Wei-Chun Wei, Taipei (TW);
Kun-Cheng Tien, New Taipei (TW);
Ming-Huei Wu, Yilan County (TW);
Jen-Yang Chung, Penghu County (TW);
Shin-Mei Gong, Taoyuan County (TW);
Cheng Wang, Yilan County (TW);
Chien-Huang Liao, Hsinchu (TW);
Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 143 days.

(21) Appl. No.: 13/913,532

(22) Filed: Jun. 10, 2013

(65) Prior Publication Data

US 2014/0307210 A1  Oct. 16, 2014

(30) Foreign Application Priority Data

Apr. 12, 2013 (TW) .............................. 102113066 A

(51) Int. Cl.
*G02F 1/1362* (2006.01)
*G02F 1/1337* (2006.01)
*G02F 1/1368* (2006.01)
*G02F 1/1343* (2006.01)

(52) U.S. Cl.
CPC ........ *G02F 1/133707* (2013.01); *G02F 1/1368* (2013.01); *G02F 1/13624* (2013.01); *G02F 2001/13685* (2013.01); *G02F 2001/134345* (2013.01); *G02F 2201/40* (2013.01)

(58) Field of Classification Search
CPC .......... G02F 1/133707; G02F 1/13624; G02F 2001/136245; G02F 2001/134345; G02F 1/136213; G02F 2201/40
See application file for complete search history.

(56) References Cited

U.S. PATENT DOCUMENTS

| 8,319,926 | B2 | 11/2012 | Shoraku et al. | |
| 8,792,065 | B2 * | 7/2014 | Yang et al. | 349/48 |
| 2010/0195034 | A1 * | 8/2010 | Lee et al. | 349/124 |
| 2011/0242443 | A1 | 10/2011 | Choi et al. | |
| 2012/0224128 | A1 | 9/2012 | Jung et al. | |
| 2012/0314174 | A1 | 12/2012 | Jung et al. | |
| 2014/0022470 | A1 * | 1/2014 | Yang et al. | 349/15 |

FOREIGN PATENT DOCUMENTS

CN    102768445 A    * 11/2012

* cited by examiner

*Primary Examiner* — Jessica M Merlin
(74) *Attorney, Agent, or Firm* — Jianq Chyun IP Office

(57) ABSTRACT

A pixel structure including a first active device, a second active device, a first pixel electrode, a second pixel electrode, a third pixel electrode, a coupling electrode, and a capacitance electrode is provided. The first pixel electrode connected to the first active device and defines a first to a fourth liquid crystal alignment domain having different alignment directions. The second pixel electrode is connected to the coupling electrode and defines a fifth to an eighth liquid crystal alignment domain having different alignment directions. The third pixel electrode is connected to the second active device and defines a ninth and a tenth liquid crystal alignment domain. The coupling electrode is connected between the first active device and the second active device and extended to pass through the first, the second, and the third pixel electrodes. The capacitance electrode respectively overlaps parts of the first, the second, and the third pixel electrodes.

31 Claims, 5 Drawing Sheets

PIXEL STRUCTURE

CROSS-REFERENCE TO RELATED APPLICATION

This application claims the priority benefit of Taiwan application serial no. 102113066, filed on Apr. 12, 2013. The entirety of the above-mentioned patent application is hereby incorporated by reference herein and made a part of this specification.

BACKGROUND OF THE DISCLOSURE

1. Field of the Disclosure

The present disclosure generally relates to a pixel structure, and more particularly, to a pixel structure having a plurality of liquid crystal alignment domains.

2. Description of Related Art

Liquid crystal molecules are optically anisotropic and can be driven by an electric field. Different grayscales are presented in a liquid crystal display (LCD) based on such characteristics of liquid crystal molecules. In an existing LCD design, the grayscale presented by each pixel structure is accomplished based on the arrangement and tilt direction of liquid crystal molecules. If all the liquid crystal molecules in a single pixel structure tilt towards the same direction, the viewing angle presented by the pixel structure is limited by the obvious optical anisotropy of the liquid crystal molecules. Thus, a technique in which liquid crystal molecules are tilted in different directions, so as to obtain different liquid crystal alignment domains, through protrusions or different exposure directions on an alignment film has been developed. Through such a technique, wide viewing angle effect can be achieved in a LCD.

However, because the tilting direction of liquid crystal molecules at the intersection (or namely boundary) of two adjacent liquid crystal alignment domains is usually not satisfactory, a desired display effect cannot be achieved, and the aperture ratio of the pixel structure is restricted. When the number of pixel electrodes in the single pixel structure is increased, the intersectional area (or namely boundary area) is also increased. As a result, the aperture ratio of the pixel structure cannot be improved. Thereby, a pixel structure with both wide viewing angle and high aperture ratio is to be developed.

SUMMARY

Accordingly, the present disclosure relates to a pixel structure with improved aperture ratio.

The present disclosure provides a pixel structure including a first active device, a second active device, a first pixel electrode, a second pixel electrode, a third pixel electrode, a coupling electrode, and a capacitance electrode. The source of the first active device is connected to a data line, and the gate of the first active device is connected to a first scan line. The source of the second active device is electrically connected to the first active device, and the gate of the second active device is connected to a second scan line. The first pixel electrode is connected to a first drain of the first active device. The first pixel electrode has a plurality of first slits, and the first slits define a first liquid crystal alignment domain, a second liquid crystal alignment domain, a third liquid crystal alignment domain, and a fourth liquid crystal alignment domain having four different alignment directions. The second pixel electrode has a plurality of second slits extending in four different directions, and the second slits define a fifth liquid crystal alignment domain, a sixth liquid crystal alignment domain, a seventh liquid crystal alignment domain, and an eighth liquid crystal alignment domain having four different alignment directions. The third pixel electrode is connected to the drain of the second active device, and the third pixel electrode has a plurality of third slits in only two different alignment directions, and the third slits define a ninth liquid crystal alignment domain and a tenth liquid crystal alignment domain. The coupling electrode is connected to a second drain of the first active device, the second pixel electrode, and the source of the second active device. The coupling electrode is extended through the first pixel electrode, the second pixel electrode, and the third pixel electrode and the coupling electrode overlaps a part of the first pixel electrode, a part of the second pixel electrode, and a part of the third pixel electrode. The capacitance electrode respectively overlaps another part of the first pixel electrode, another part of the second pixel electrode, and another part of the third pixel electrode.

According to an embodiment of the present disclosure, the seventh liquid crystal alignment domain is located between the fifth liquid crystal alignment domain and the ninth liquid crystal alignment domain, and the eighth liquid crystal alignment domain is located between the sixth liquid crystal alignment domain and the tenth liquid crystal alignment domain. The total area of the fifth liquid crystal alignment domain and the ninth liquid crystal alignment domain is substantially equal to the total area of the sixth liquid crystal alignment domain and the tenth liquid crystal alignment domain. The total area of the fifth liquid crystal alignment domain and the ninth liquid crystal alignment domain is substantially equal to the area of the seventh liquid crystal alignment domain, or the total area of the sixth liquid crystal alignment domain and the tenth liquid crystal alignment domain is substantially equal to the area of the eighth liquid crystal alignment domain. Alternately, the area of the seventh liquid crystal alignment domain and the area of the eighth liquid crystal alignment domain are substantially larger than the area of the fifth liquid crystal alignment domain and the area of the sixth liquid crystal alignment domain.

According to an embodiment of the present disclosure, the first pixel electrode has a first trunk and a second trunk intersecting the first trunk for defining the first liquid crystal alignment domain, the second liquid crystal alignment domain, the third liquid crystal alignment domain, and the fourth liquid crystal alignment domain, and the plurality of first slits is respectively disposed in the first liquid crystal alignment domain, the second liquid crystal alignment domain, the third liquid crystal alignment domain, and the fourth liquid crystal alignment domain. Meanwhile, the second pixel electrode has a third trunk and a fourth trunk intersecting the third trunk for defining the fifth liquid crystal alignment domain, the sixth liquid crystal alignment domain, the seventh liquid crystal alignment domain, and the eighth liquid crystal alignment domain, and the plurality of second slits is respectively disposed in the fifth liquid crystal alignment domain, the sixth liquid crystal alignment domain, the seventh liquid crystal alignment domain, and the eighth liquid crystal alignment domain.

According to an embodiment of the present disclosure, the pixel structure further includes an auxiliary electrode. The auxiliary electrode is connected to the coupling electrode, and the alignment direction of the ninth liquid crystal alignment domain and the alignment direction of the tenth liquid crystal alignment domain point to an intersection of the coupling electrode and the auxiliary electrode. The dimension of the auxiliary electrode is substantially greater than a half width of the third pixel electrode or is substantially equal to the width of the third pixel electrode. The auxiliary electrode is selectively located between the second scan line and the third pixel electrode.

According to an embodiment of the present disclosure, the area of the first liquid crystal alignment domain, the area of the second liquid crystal alignment domain, the area of the third liquid crystal alignment domain, and the area of the fourth liquid crystal alignment domain are approximately the same.

As described above, a pixel structure provided by an embodiment of the present disclosure has three pixel electrodes, and at least one of the pixel electrodes has only two liquid crystal alignment domains, so that the number of intersections of liquid crystal alignment domains is reduced. Accordingly, an optimal aperture ratio of the pixel structure is achieved. In addition, a uniform alignment effect can be achieved by adjusting the areas of the liquid crystal alignment domains of different pixel electrodes. Thereby, in a pixel structure provided by an embodiment of the present invention, the aperture ratio is increased by reducing the number of intersections of liquid crystal alignment domains, and a desired alignment effect is achieved by adjusting the areas of the liquid crystal alignment domains. In other words, the pixel structure offers a high aperture ratio and a wide viewing angle.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the invention and, together with the description, serve to explain the principles of the disclosure.

DESCRIPTION OF THE EMBODIMENTS

Figure 1:
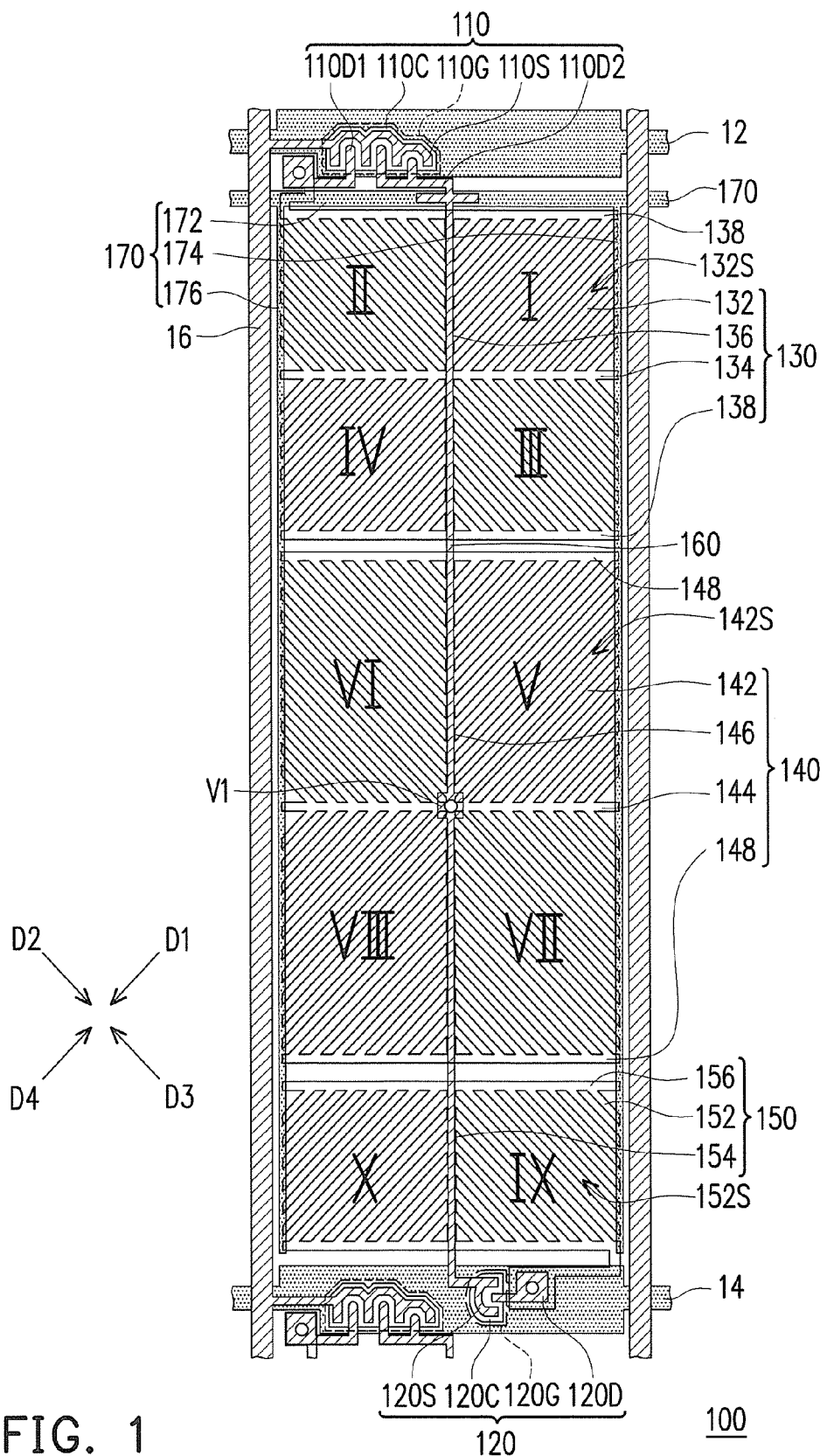
FIG. 1 is a top view of a pixel structure according to a first embodiment of the present disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a top view of a pixel structure according to a first embodiment of the present disclosure. Referring to FIG. 1, the pixel structure (or namely single pixel structure) 100 includes a first active device 110, a second active device 120, a first pixel electrode 130, a second pixel electrode 140, a third pixel electrode 150, a coupling electrode 160, and a capacitance electrode 170. In a single pixel structure 100, the first pixel electrode 130, the second pixel electrode 140, and the third pixel electrode 150 are separated from each other (i.e., a spacing (not marked) exists between the first pixel electrode 130 and the second pixel electrode 140, and a spacing (not marked) exists between the second pixel electrode 140 and the third pixel electrode 150). Regarding the driving circuit, two active devices (i.e., the first active device 110 and the second active device 120) are disposed in the pixel structure 100, and the pixel structure 100 is electrically connected to a single data line 16 and the pixel structure 100 is driven by a first scan line 12 and a second scan line 14. However, the present disclosure is not limited thereto. In other embodiments, the single pixel structure 100 may be driven by more active devices or connected to more than one data line 16, and the number of scan lines 12 and 14 is not limited either. It should be mentioned that when a plurality of pixel structures 100 is arranged into an array, the second scan line 14 connected to each pixel structure 100 may be the first scan line 12 of another pixel structure 100 on the previous or the next row, or the first scan line 12 connected to each pixel structure 100 may be the second scan line 14 of another pixel structure 100 on the previous or the next row.

To be specific, the first active device 110 includes a gate 110G, a channel layer 110C, a source 110S, a first drain 110D1, and a second drain 110D2. The channel layer 110C is disposed between a film layer of the first scan line 12 and a film layer of the source 110S, the first drain 110D1, and the second drain 110D2. The source 110S, the first drain 110D1, and the second drain 110D2 are located on the channel layer 110C and connected to the channel layer 110C. Because the part of the first scan line 12 shielded (or namely covered) by the channel layer 110C can be considered as the gate 110G, the gate 110G of the first active device 110 and the first scan line 12 are connected with each other or formed integrally. In addition, the source 110S of the first active device 110 is connected to the data line 16.

The second active device 120 includes a gate 120G, a channel layer 120C, a source 120S, and a drain 120D. The channel layer 120C is between a film layer of the second scan line 14 and a film layer of the source 120S and the drain 120D. The source 120S and the drain 120D are located on the channel layer 120C and connected to the channel layer 120C. The source 120S of the second active device 120 is electrically connected to the second drain 110D2 of the first active device 110, and the gate 120G of the second active device 120 is connected to the second scan line 14. In the present embodiment, the first active device 110 and the second active device 120 are respectively a bottom-gate type transistors as example. However, the present disclosure is not limited thereto, and the first active device 110 and the second active device 120 may also be a top-gate type transistors or any other suitable type of transistors. In the present embodiment, the channel layers 110C and 120C may be made of a single-layer or multi-layer semiconductor material, such as amorphous silicon, polysilicon, nanocrystalline silicon, monocrystalline silicon, nanocrystal silicon, carbon nanotubes, an oxide semiconductor material, an organic semiconductor material, or any other suitable semiconductor material.

In the present embodiment, the first pixel electrode 130 is connected to the first drain 110D1 of the first active device 110. The coupling electrode 160 is connected to the second drain 110D2 of the first active device 110, the second pixel electrode 140, and the source 120S of the second active device 120. In the present embodiment, the part of the second drain 110D2 close to the source 110S can be selectively connected or not connected to the first drain 110D1, which is not limited in the present disclosure. The coupling electrode 160 and the second pixel electrode 140 are connected with each other through, for example, a contact window V1. Thus, the second pixel electrode 140 is electrically connected to the second drain 110D2 of the first active device 110 through the coupling electrode 160. When the first active device 110 is turned on by the driving of the first scan line 12, the first pixel electrode 130 and the second pixel electrode 140 receive the voltage transmitted on the data line 16. The third pixel electrode 150 is connected to the drain 120D of the second active device 120.

To be specific, the coupling electrode 160 is an extended electrode pattern, and substantially passes through the first pixel electrode 130, the second pixel electrode 140, and the third pixel electrode 150 so as to overlap a part of the first pixel electrode 130, a part of the second pixel electrode 140, and a part of the third pixel electrode 150. Herein the shape of the coupling electrode 160 is not limited to a bar shape. Instead, the coupling electrode 160 may also have a triangular shape, a diamond shape, a polygonal shape, a curving shape, an arc shape, a zigzag shape, or any other suitable shape. When the first active device 110 is turned on by the driving of the first scan line 12, the coupling electrode 160 connected to the second drain 110D2 receives the voltage on the data line 16 and transmits the voltage to the second pixel electrode 140. Meanwhile, the first pixel electrode 130 receives the voltage transmitted by the first drain 110D1.

Next, when the second active device 120 is turned on by the driving of the second scan line 14, because the coupling electrode 160 is connected to the second pixel electrode 140, the voltage on the second pixel electrode 140 can be shared with the third pixel electrode 150 through the turned-on second active device 120. Through the coupling effect between the coupling electrode 160 and the first pixel electrode 130, the voltage on both the second pixel electrode 140 and the third pixel electrode 150 is different from that on the first pixel electrode 130. Thus, the problem of color washout can be resolved (improved).

Additionally, in order to achieve a stable display quality in the pixel structure 100, the capacitance electrode 170 in the pixel structure (or namely the single pixel structure) 100 respectively overlaps another part of the first pixel electrode 130, another part of the second pixel electrode 140, and another part of the third pixel electrode 150. To be specific, the capacitance electrode 170 includes a connecting portion 172 and two branching portions 174 and 176. The connecting portion 172 is substantially parallel to the first scan line 12 and located between the first pixel electrode 130 and the first scan line 12. The two branching portions 174 and 176 are located at two opposite sides (for example, the left and right sides) of the pixel structure 100 and are both connected to the connecting portion 172. The another part of the first pixel electrode 130, the another part of the second pixel electrode 140, and the another part of the third pixel electrode 150 overlapping the branching portions 174 and 176 provide a desired storage capacitance. At least one of the connecting portion 172 and the two branching portions 174 and 176 is in a bar shape or other shape such as a triangular shape, a diamond shape, a polygonal shape, a curving shape, an arc shape, a zigzag shape, or any other suitable shape, or at least two shape combinations thereof. Moreover, the width of the connecting portion 172 is substantially the same as the width of at least one of the branching portions 174 and 176.

The first pixel electrode 130 has a plurality of first slits 132S. The first slits 132S define a first liquid crystal alignment domain I, a second liquid crystal alignment domain II, a third liquid crystal alignment domain III, and a fourth liquid crystal alignment domain IV having different alignment directions. To be specific, the first pixel electrode 130 includes a plurality of first stripes (or namely first branch) 132, a first trunk (or namely first main truck) 134, and a second trunk (or namely second main truck) 136 intersecting the first trunk 134, where the first slits 132S are gaps between the first stripes 132. The intersecting first trunk 134 and second trunk 136 are boundaries of the first liquid crystal alignment domain I, the second liquid crystal alignment domain II, the third liquid crystal alignment domain III, and the fourth liquid crystal alignment domain IV. Besides, the first pixel electrode 130 selectively includes two border patterns 138, and the two border patterns 138 are located at two opposite sides of the first pixel electrode 130. One of the two border patterns 138 is located at the side of the first pixel electrode 130 adjacent to the first scan line 12, and the other one is located at the side of the first pixel electrode 130 away from the first scan line 12. At least one of the first slits 132S, the first stripes 132, the first trunk 134, the second trunk 136, and the border patterns 138 has a bar shape, a triangular shape, a quadrilateral shape, a diamond shape, a trapezoidal shape, a round shape, an oval shape, a polygonal shape, a curving shape, an arc shape, a zigzag shape, and any other suitable shape or at least two shape combinations thereof. At least one first slit 132S of at least one of the first liquid crystal alignment domain I, the second liquid crystal alignment domain II, the third liquid crystal alignment domain III, and the fourth liquid crystal alignment domain IV selectively has one or more widths.

A portion of the first slits 132S in the first liquid crystal alignment domain I is substantially parallel to a first alignment direction D1. Thus, the first liquid crystal alignment domain I defines the first alignment direction D1. Similarly, the first slits 132S in the second liquid crystal alignment domain II define a second alignment direction D2, the first slits 132S in the third liquid crystal alignment domain III define a third alignment direction D3, and the first slits 132S in the fourth liquid crystal alignment domain IV define a fourth alignment direction D4. Wherein the four alignment direction D1 to D4 is different from each other.

In the first pixel electrode 130, the first alignment direction D1, the second alignment direction D2, the third alignment direction D3, and the fourth alignment direction D4 are defined by the first slits 132S in different regions pointing (or namely converging) toward the intersection point of the first trunk 134 and the second trunk 136. Additionally, the areas of the first liquid crystal alignment domain I, the second liquid crystal alignment domain II, the third liquid crystal alignment domain III, and the fourth liquid crystal alignment domain IV of the first pixel electrode 130 are substantially the same, so that similar or the same display brightness can be provided at different viewing angles. However, the present disclosure is not limited thereto, and in other embodiments, the areas of the first liquid crystal alignment domain I, the second liquid crystal alignment domain II, the third liquid crystal alignment domain III, and the fourth liquid crystal alignment domain IV can be adjusted according to the desired viewing angle of the product. Thus, the areas of the first liquid crystal alignment domain I, the second liquid crystal alignment domain II, the third liquid crystal alignment domain III, and the fourth liquid crystal alignment domain IV do not have to be substantially the same.

Similar to the first pixel electrode 130, the second pixel electrode 140 has a plurality of second slits 142S in four different directions, and these second slits 142S respectively define a fifth liquid crystal alignment domain V, a sixth liquid crystal alignment domain VI, a seventh liquid crystal alignment domain VII, and a eighth liquid crystal alignment domain VIII having different alignment directions. To be specific, the second pixel electrode 140 includes a plurality of second stripes (or namely second branch) 142, a third trunk (or namely third main truck) 144, and a fourth trunk (or namely fourth main truck) 146 intersecting the third trunk 144, and the second slits 142S are formed between the second stripes 142. The third trunk 144 and fourth trunk 146 intersecting each other are boundaries of the fifth liquid crystal alignment domain V, the sixth liquid crystal alignment domain VI, the seventh liquid crystal alignment domain VII, and the eighth liquid crystal alignment domain VIII. Additionally, the second pixel electrode 140 selectively includes two border patterns 148, and the two border patterns 148 are located at two opposite sides of the second pixel electrode 140. When the second pixel electrode 140 is located between the first pixel electrode 130 and the third pixel electrode 150, the two border patterns 148 are respectively located between the first pixel electrode 130 and the second pixel electrode 140 and between the second pixel electrode 140 and the third pixel electrode 150. At least one of the second slits 142S, the second stripes 142, the third trunk 144, the fourth trunk 146, and the border patterns 148 has a bar shape, a triangular shape, a quadrilateral shape, a diamond shape, a trapezoidal shape, a round shape, an oval shape, a polygonal shape, a curving shape, an arc shape, a zigzag shape, or any other suitable shape, or at least two shape combinations thereof. Moreover, at least one second slit 142S of at least one of the fifth liquid crystal alignment domain V, the sixth liquid crystal alignment domain VI, the seventh liquid crystal alignment domain VII, and the eighth liquid crystal alignment domain VIII selectively has one or more widths.

The second stripes 142 and the second slits 142S in the fifth liquid crystal alignment domain V are substantially parallel to the first alignment direction D1, the second stripes 142 and the second slits 142S in the sixth liquid crystal alignment domain VI are substantially parallel to the second alignment direction D2, the second stripes 142 and the second slits 142S in the seventh liquid crystal alignment domain VII are substantially parallel to the third alignment direction D3, and the second stripes 142 and the second slits 142S in the eighth liquid crystal alignment domain VIII are substantially parallel to the fourth alignment direction D4. In the second pixel electrode 140, the first alignment direction D1, the second alignment direction D2, the third alignment direction D3, and the fourth alignment direction D4 are defined by the second slits 142S in different regions pointing (or namely diverging) toward the intersection points of the third trunk 144 and the fourth trunk 146. Wherein the four alignment direction D1 to D4 is different from each other.

The third pixel electrode 150 has a plurality of third slits 152S in only two different alignment directions, and the third slits 152S respectively define a ninth liquid crystal alignment domain IX and a tenth liquid crystal alignment domain X. To be specific, the third pixel electrode 150 includes a plurality of third stripes (or namely third branch) 152 and a fifth trunk (or namely fifth main truck) 154, and the third slits 152S are defined between the third stripes 152. The fifth trunk 154 is the boundary between the ninth liquid crystal alignment domain IX and the tenth liquid crystal alignment domain X. Additionally, the third pixel electrode 150 selectively includes two border patterns 156, and the two border patterns 156 are located at two opposite sides of the third pixel electrode 150. In the present embodiment, the third stripes 152 and the third slits 152S in the ninth liquid crystal alignment domain IX are substantially parallel to the third alignment direction D3, and the third stripes 152 and the third slits 152S in the tenth liquid crystal alignment domain X are substantially parallel to the fourth alignment direction D4. At least one of the third slits 152S, the third stripes 152, the fifth trunk 154, and the border patterns 156 has a bar shape, a triangular shape, a quadrilateral shape, a diamond shape, a trapezoidal shape, a round shape, an oval shape, a polygonal shape, a curving shape, an arc shape, a zigzag shape, or any other suitable shape, or at least two shape combinations thereof. At least one third slit 152S of at least one of the ninth liquid crystal alignment domain IX and the tenth liquid crystal alignment domain X selectively has one or more widths.

It should be mentioned that the third pixel electrode 150 only defines two liquid crystal alignment domains (i.e., the ninth liquid crystal alignment domain IX and the tenth liquid crystal alignment domain X). Thus, the third pixel electrode 150 has only one trunk pattern (or namely main truck pattern, i.e., the fifth trunk 154). When the pixel structure 100 is applied to a liquid crystal display (LCD) for driving liquid crystal molecules, the liquid crystal molecules corresponding to different alignment domains can tilt, ideally, along different alignment directions to present a desired transmittance. However, at the boundaries of adjacent liquid crystal alignment domains (i.e., the positions where the first, second, third, fourth, and fifth trunks 134, 136, 144, 146, and 154 are in the present embodiment), the tilting directions of the liquid crystal molecules are not stable. Thus, the display brightness of these areas is usually low or unsatisfactory. Because the third pixel electrode 150 has only the ninth liquid crystal alignment domain IX and the tenth liquid crystal alignment domain X and only one trunk (or namely main truck), i.e. the fifth trunk 154, the third pixel electrode 150 offers an optimal transmittance (brightness).

Figure 2:
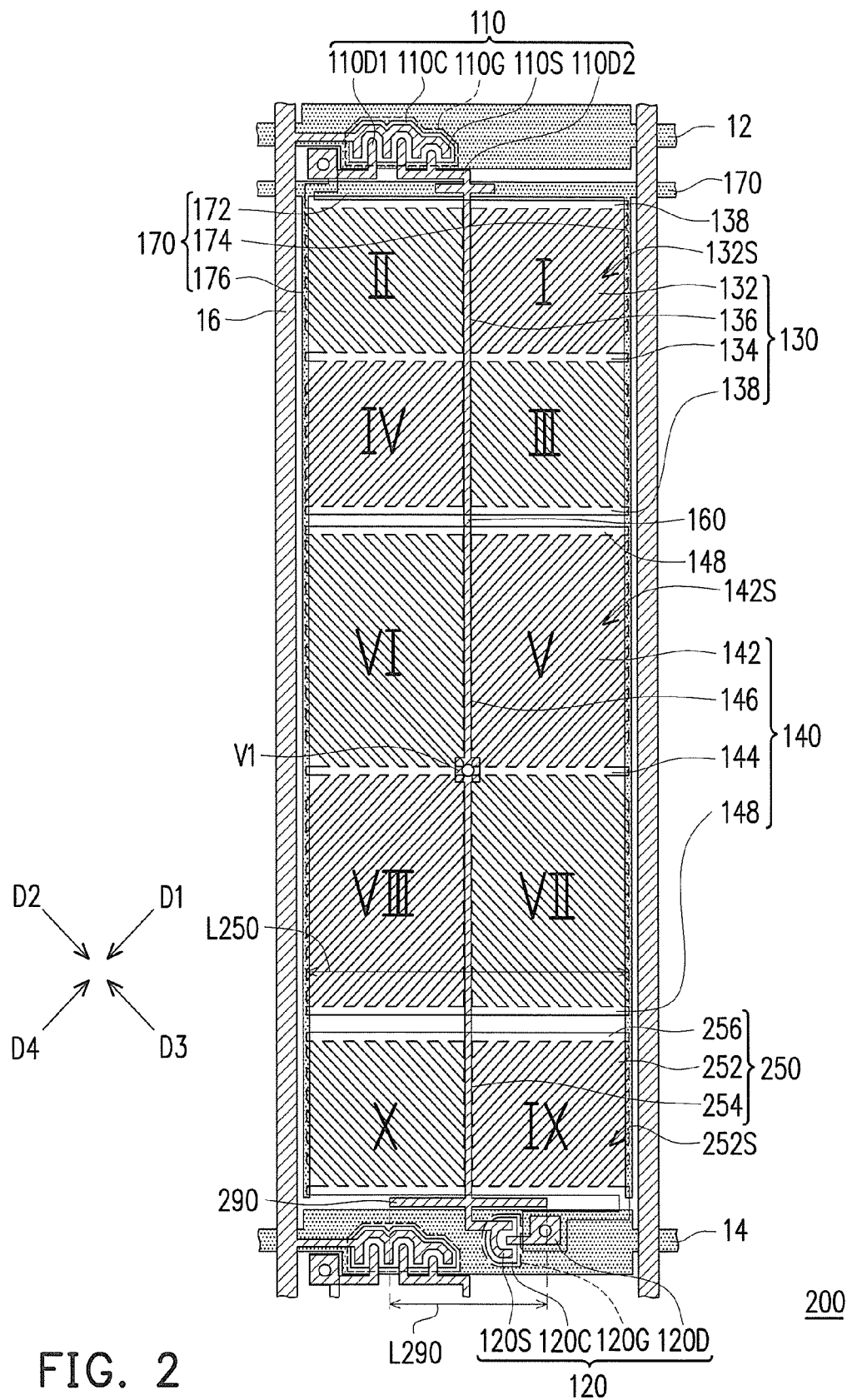
FIG. 2 is a top view of a pixel structure according to a second embodiment of the present disclosure.

FIG. 2 is a top view of a pixel structure according to a second embodiment of the present invention. Referring to FIG. 2, the pixel structure 200 is similar to the pixel structure 100, and accordingly like elements throughout the two embodiments will be referred to with like reference numerals and will not be described herein. To be specific, the difference between the present embodiment and the first embodiment falls on the pattern design of the third pixel electrode 250. Besides, the pixel structure 200 further includes an auxiliary electrode 290.

In the present embodiment, the third pixel electrode 250 has a plurality of third slits 252S, and the third slits 252S define only a ninth liquid crystal alignment domain IX and a tenth liquid crystal alignment domain X. To be specific, the third pixel electrode 250 includes a plurality of third stripes (or namely third branches) 252, only one fifth trunk (or namely fifth main truck) 254, and two border patterns 256. The spacings between the third stripes 252 are defined as the third slits 252S, and the two border patterns 256 are located at two opposite sides of the third pixel electrode 250. The fifth trunk 254 is located at the boundary between the ninth liquid crystal alignment domain IX and the tenth liquid crystal alignment domain X. In addition, the third stripes 252 and the third slits 252S in the ninth liquid crystal alignment domain IX are substantially parallel to the first alignment direction D1, and the third stripes 252 and the third slits 252S in the tenth liquid crystal alignment domain X are substantially parallel to the second alignment direction D2. Namely, the third pixel electrode 250 in the present embodiment differs from the third pixel electrode 150 in the first embodiment on how the third slits 252S define the alignment directions.

Moreover, in the present embodiment, the auxiliary electrode 290 in the pixel structure 200 intersects the coupling electrode 160. The auxiliary electrode 290 is substantially located between the second scan line 14 (may also be the first scan line 12 of the pixel structure on a next/previous row) and the third pixel electrode 250 and the auxiliary electrode 290 is substantially parallel to one of the border patterns 256. Preferably, the third pixel electrode 250 overlaps at least a part of the auxiliary electrode 290 to form an auxiliary capacitor (not shown) that improves the distribution of electric field. The auxiliary electrode 290 has a bar shape, a triangular shape, a quadrilateral shape, a diamond shape, a trapezoidal shape, a round shape, an oval shape, a polygonal shape, a curving shape, an arc shape, a zigzag shape, or any other suitable shape, or at least two shape combinations thereof. Accordingly, the alignment direction D1 of the ninth liquid crystal alignment domain IX and the alignment direction D2 of the tenth liquid crystal alignment domain X substantially point (or namely diverge) toward the intersection point between the coupling electrode 160 and the auxiliary electrode 290. When the pixel structure 200 is applied to a LCD for driving liquid crystal molecules, the auxiliary electrode 290 assists the distribution of the driving electric field so that the liquid crystal molecules in the ninth liquid crystal alignment domain IX can tilt along a first alignment direction D1 and the liquid crystal molecules in the tenth liquid crystal alignment domain X can tilt along a second alignment direction D2. Namely, the disposition of the auxiliary electrode 290 improves the display quality presented when the pixel structure 200 drives liquid crystal molecules.

In the present embodiment, the dimension (or namely length) L290 of the auxiliary electrode 290 is substantially greater than at least half of the width L250 of the third pixel electrode 250. In other embodiments, the dimension L290 of the auxiliary electrode 290 can be equal to the width L250 of the third pixel electrode 250. The dimension L290 of the auxiliary electrode 290 relates to the distribution of the driving electric field. Thus, the dimension L290 of the auxiliary electrode 290 can be adjusted according to different design requirement. Wherein a first side of the third pixel electrode 250 is substantially parallel to at least one of the scan lines 14, 16 is as a width, a second side of the third pixel electrode 250 is substantially parallel to the data line 16 is as a length, and the first side intersects the second side, preferred, the first side is substantially vertical to the second side.

Additionally, in the present embodiment and the first embodiment illustrated in FIG. 1, the area of the first liquid crystal alignment domain I, the area of the second liquid crystal alignment domain II, the area of the third liquid crystal alignment domain III, and the area of the fourth liquid crystal alignment domain IV are approximately the same. Meanwhile, the area of the fifth liquid crystal alignment domain V, the area of the sixth liquid crystal alignment domain VI, the area of the seventh liquid crystal alignment domain VII, and the area of the eighth liquid crystal alignment domain VIII are approximately the same. Besides, the area of the ninth liquid crystal alignment domain IX is approximately the same as that of the tenth liquid crystal alignment domain X. However, the present disclosure is not limited thereto. Additionally, the total area of the fifth liquid crystal alignment domain V and the ninth liquid crystal alignment domain IX is substantially equal to a total area of the sixth liquid crystal alignment domain VI and the tenth liquid crystal alignment domain X. Preferred, the total area of the seventh liquid crystal alignment domain VII and the ninth liquid crystal alignment domain IX is substantially equal to the total area of the eighth liquid crystal alignment domain VIII and the tenth liquid crystal alignment domain X.

Figure 3:
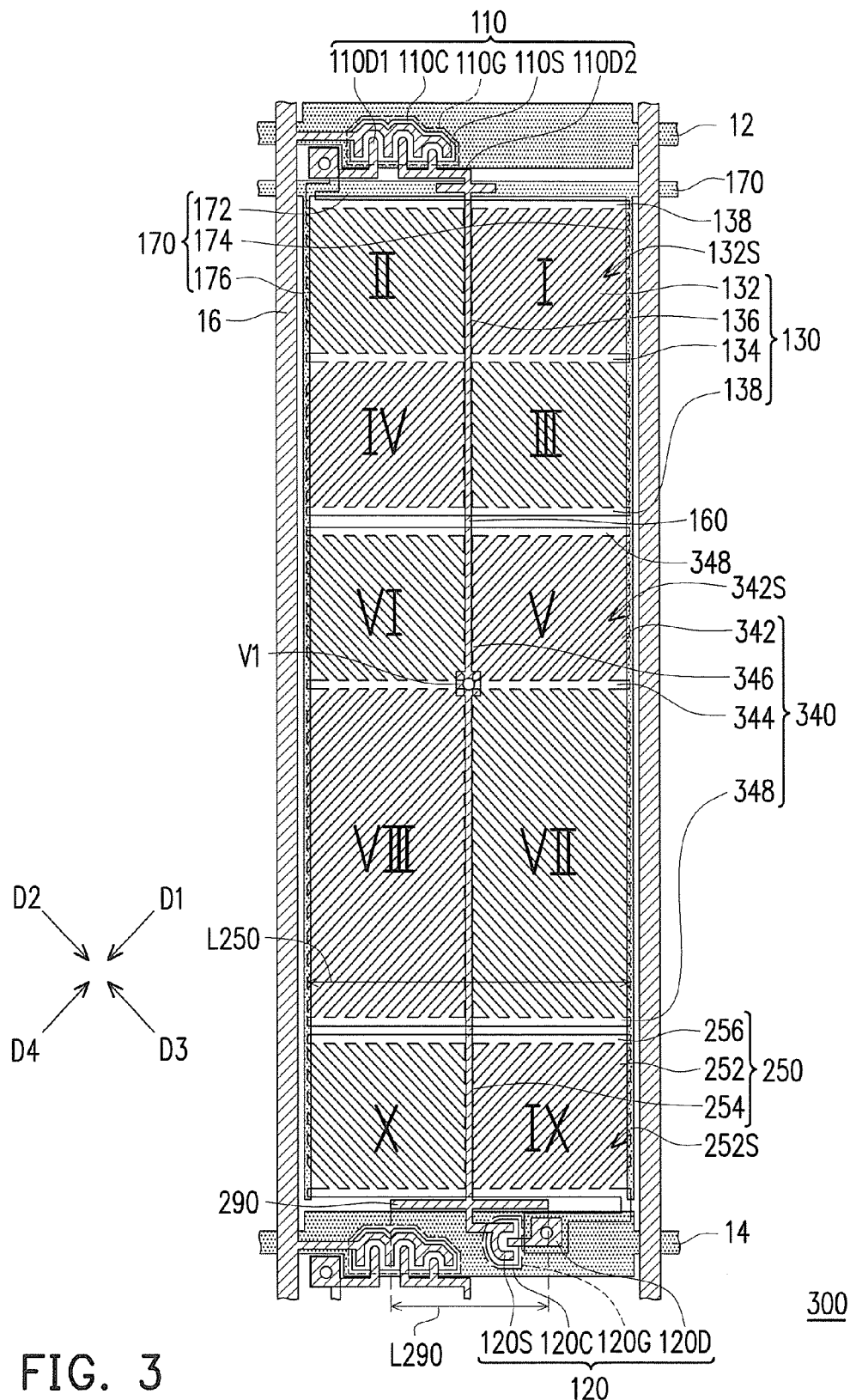
FIG. 3 is a top view of a pixel structure according to a third embodiment of the present disclosure.

FIG. 3 is a top view of a pixel structure according to a third embodiment of the present invention. Referring to FIG. 3, the pixel structure 300 is similar to the pixel structure 200, and accordingly like elements throughout the two embodiments will be referred to with like reference numerals and will not be described herein. To be specific, the difference between the present embodiment and the second embodiment falls on the pattern design of the second pixel electrode 340. In the present embodiment, the second pixel electrode 340 includes a plurality of second stripes (or namely branch) 342, a third trunk (or namely third main truck) 344, a fourth trunk (or namely fourth main truck) 346, and two border patterns 348. The spacings between the second stripes 342 are defined as a plurality of second slits 342S. At least one of the second stripes 342, the third trunk 344, the fourth trunk 346, and the two border patterns 348 can have the shape(s) and width(s) as described in foregoing embodiments.

In the present embodiment, the third trunk 344 intersects the fourth trunk 346 to define a fifth liquid crystal alignment domain V, a sixth liquid crystal alignment domain VI, a seventh liquid crystal alignment domain VII, and an eighth liquid crystal alignment domain VIII. The second slits 342S in the fifth liquid crystal alignment domain V are substantially parallel to the first alignment direction D1. The second slits 342S in the sixth liquid crystal alignment domain VI are substantially parallel to the second alignment direction D2. The second slits 342S in the seventh liquid crystal alignment domain VII are substantially parallel to the third alignment direction D3. The second slits 342S in the eighth liquid crystal alignment domain VIII are substantially parallel to the fourth alignment direction D4.

In the present embodiment, the alignment directions defined by the fifth liquid crystal alignment domain V and the ninth liquid crystal alignment domain IX are substantially parallel to the first alignment direction D1, and the alignment directions defined by the sixth liquid crystal alignment domain VI and the tenth liquid crystal alignment domain X are substantially parallel to the second alignment direction D2. Thus, the fifth liquid crystal alignment domain V and the ninth liquid crystal alignment domain IX approximately contribute to the same viewing angle while the sixth liquid crystal alignment domain VI and the tenth liquid crystal alignment domain X approximately contribute to the same viewing angle. In order to achieve a uniform brightness at every viewing angle, the areas of the liquid crystal alignment domains in different alignment directions should be approximately the same. Thus, in the present embodiment, the total area of the fifth liquid crystal alignment domain V and the ninth liquid crystal alignment domain IX is approximately equal to the area of the seventh liquid crystal alignment domain VII, and the total area of the sixth liquid crystal alignment domain VI and the tenth liquid crystal alignment domain X is approximately equal to the area of the eighth liquid crystal alignment domain VIII. Preferred, the area of the of the seventh liquid crystal alignment domain VII is substantially equal to the area of the eighth liquid crystal alignment domain VIII.

Figure 4:
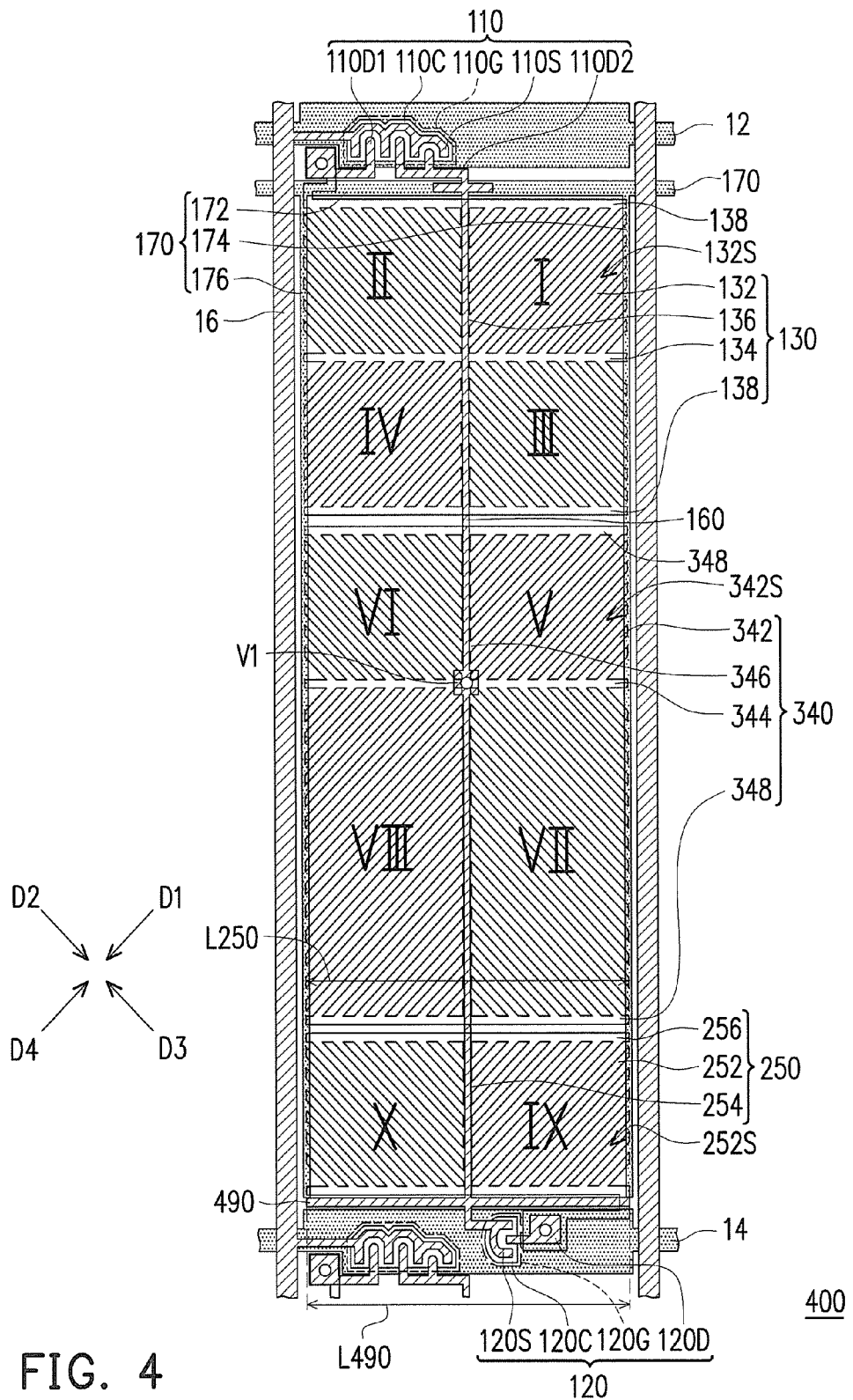
FIG. 4 is a top view of a pixel structure according to a fourth embodiment of the present invention.

FIG. 4 is a top view of a pixel structure according to a fourth embodiment of the present disclosure. Referring to FIG. 4, the pixel structure 400 is approximately the same as the pixel structure 300, and accordingly the same elements throughout the two embodiments will not be described herein and can be referred to related descriptions in foregoing embodiments. In the present embodiment, the dimension (or namely length) L490 of the auxiliary electrode 490 in the pixel structure 400 is substantially equal to the width L250 of the third pixel electrode 250. The longer the dimension L490 of the auxiliary electrode 490 is, the more the effect on the driving electric field provides. Thus, the dimension L490 of the auxiliary electrode 490 can be determined according to the actual design or manufacturing requirement. Wherein a first side of the third pixel electrode 250 is substantially parallel to at least one of the scan lines 14, 16 is as a width, a second side of the third pixel electrode 250 is substantially parallel to the data line 16 is as a length, and the first side intersects the second side, preferred, the first side is substantially vertical to the second side.

In each embodiment described above, the third pixel electrode (150 or 250) has only two liquid crystal alignment domains (i.e., the ninth liquid crystal alignment domain IX and the tenth liquid crystal alignment domain X). Thus, in the third pixel electrode 150 or 250, because the boundaries of the liquid crystal alignment domains at where the liquid crystal molecules tilt in ambiguous directions take up only very small areas, a higher aperture ratio can be achieved. Additionally, in FIG. 2 to FIG. 4, because the disposition of the auxiliary electrode 290 and 490 improves the distribution of the driving electric field, ideal arrangement and tilting directions of liquid crystal molecules are achieved when the pixel structures 200 to 400 are used for driving the liquid crystal molecules. Thereby, besides the improvement of the aperture ratio, the disposition of the auxiliary electrodes 290 and 490 further improves the display quality. Moreover, referring to FIG. 2 to FIG. 4, a pixel structure provided by the present disclosure selectively includes an additional auxiliary electrode (not shown) between the first scan line 12 and the first pixel electrode 130 and connecting to the coupling electrode 160. Preferably, the capacitance electrode 170 overlaps at least a part of the additional auxiliary electrode (not shown) to form an additional auxiliary capacitor which improves the distribution of electric field. The dimension (or namely length) and shape of the additional auxiliary electrode (not shown) can be referred to the dimension (or namely length) and shape of the auxiliary electrode 290 described above.

Figure 5:
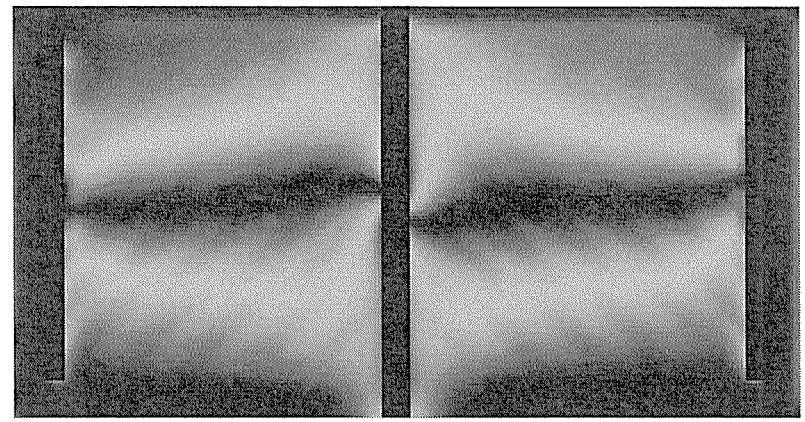
FIG. 5 illustrates a simulated transmittance effect when a third pixel electrode of the pixel structure in FIG. 1 drives liquid crystal molecules.
Figure 6:
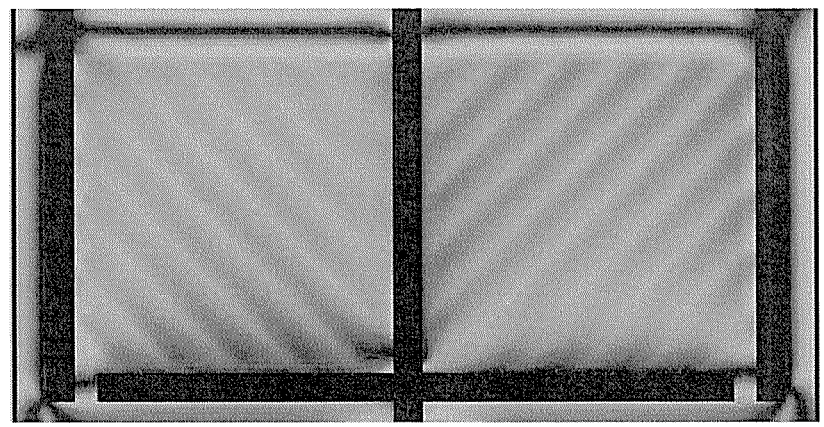
FIG. 6 illustrates a simulated transmittance effect when third pixel electrode of the pixel structure in FIG. 4 drives liquid crystal molecules.

FIG. 5 illustrates a simulated transmittance effect when a third pixel electrode of the pixel structure in FIG. 1 drives liquid crystal molecules, and FIG. 6 illustrates a simulated transmittance effect when third pixel electrode of the pixel structure in FIG. 4 drives liquid crystal molecules. In FIG. 5, because the electric field driving the liquid crystal molecules is not controlled in a very satisfactory manner, the transmittance is relatively poor. Especially, dark lines are presented in the middle of the pixel electrode (i.e., the third pixel electrode 150), which indicates an unsatisfactory electric field distribution. Moreover, large areas of dark lines exist at the boundary between the second pixel electrode 140 and the third pixel electrode 150, which also indicates the unsatisfactory electric field distribution. It can be observed in FIG. 6 that the disposition of the auxiliary electrode 490 greatly improves the distribution of electric field, so that the liquid crystal molecules tilt properly and an optimal transmittance is achieved.

As described above, in a pixel structure provided by an embodiment of the present disclosure, only two liquid crystal alignment domains are disposed in at least one pixel electrode to reduce the number of intersections between liquid crystal alignment domains. With the decrease in the boundary area of the liquid crystal alignment domains, unsatisfactory display effect at the boundaries of the liquid crystal alignment domains is improved. In addition, a uniform alignment effect of liquid crystal alignment domains in different pixel electrodes can be accomplished by adjusting the areas of the liquid crystal alignment domains. Thereby, in a pixel structure provided by an embodiment of the present invention, besides increasing the aperture ratio by reducing the number of intersections between liquid crystal alignment domains, a desired alignment effect can be further accomplished by adjusting the areas of the liquid crystal alignment domains. Moreover, an auxiliary electrode can be disposed in the pixel structure to improve the distribution of the driving electric field, so as to achieve an optimal display effect.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A pixel structure, comprising:
   a first active device, wherein a source of the first active device is connected to a data line, and a gate of the first active device is connected to a first scan line;
   a second active device, wherein a source of the second active device is electrically connected to the first active device, and a gate of the second active device is connected to a second scan line;
   a first pixel electrode, connected to a first drain of the first active device, and having a plurality of first slits, wherein the first slits in four different alignment directions respectively define a first liquid crystal alignment domain, a second liquid crystal alignment domain, a third liquid crystal alignment domain, and a fourth liquid crystal alignment domain;
   a second pixel electrode, having a plurality of second slits, wherein the second slits in the four different alignment directions respectively define a fifth liquid crystal alignment domain, a sixth liquid crystal alignment domain, a seventh liquid crystal alignment domain, and an eighth liquid crystal alignment domain;
   a third pixel electrode, connected to a drain of the second active device, and having a plurality of third slits, wherein the third slits consist of two different alignment directions, and the third slits in two different alignment directions respectively define a ninth liquid crystal alignment domain and a tenth liquid crystal alignment domain;
   a coupling electrode, connected to a second drain of the first active device, the second pixel electrode, and the source of the second active device, wherein the coupling electrode is extended to pass through the first pixel electrode, the second pixel electrode, and the third pixel electrode, and the coupling electrode is overlapping a part of the first pixel electrode, a part of the second pixel electrode, and a part of the third pixel electrode; and
   a capacitance electrode, respectively overlapping another part of the first pixel electrode, another part of the second pixel electrode, and another part of the third pixel electrode.

2. The pixel structure according to claim 1, wherein the seventh liquid crystal alignment domain is located between the fifth liquid crystal alignment domain and the ninth liquid crystal alignment domain, and the eighth liquid crystal alignment domain is between the sixth liquid crystal alignment domain and the tenth liquid crystal alignment domain.

3. The pixel structure according to claim 2, wherein a total area of the fifth liquid crystal alignment domain and the ninth liquid crystal alignment domain is substantially equal to a total area of the sixth liquid crystal alignment domain and the tenth liquid crystal alignment domain.

4. The pixel structure according to claim 2, wherein a total area of the fifth liquid crystal alignment domain and the ninth liquid crystal alignment domain is substantially equal to an area of the seventh liquid crystal alignment domain, or a total area of the sixth liquid crystal alignment domain and the tenth liquid crystal alignment domain is substantially equal to an area of the eighth liquid crystal alignment domain.

5. The pixel structure according to claim 2, wherein an area of the seventh liquid crystal alignment domain and an area of the eighth liquid crystal alignment domain are substantially larger than an area of the fifth liquid crystal alignment domain and an area of the sixth liquid crystal alignment domain.

6. The pixel structure according to claim 1, wherein the first pixel electrode has a first trunk and a second trunk intersecting the first trunk for defining the first liquid crystal alignment domain, the second liquid crystal alignment domain, the third liquid crystal alignment domain, and the fourth liquid crystal alignment domain, and the first slits are disposed in the first liquid crystal alignment domain, the second liquid crystal alignment domain, the third liquid crystal alignment domain, and the fourth liquid crystal alignment domain, and the second pixel electrode has a third trunk and a fourth trunk intersecting the third trunk for defining the fifth liquid crystal alignment domain, the sixth liquid crystal alignment domain, the seventh liquid crystal alignment domain, and the eighth liquid crystal alignment domain, and the first slits are disposed in the fifth liquid crystal alignment domain, the sixth liquid crystal alignment domain, the seventh liquid crystal alignment domain, and the eighth liquid crystal alignment domain.

7. The pixel structure according to claim 1 further comprising an auxiliary electrode, wherein the auxiliary electrode is connected to the coupling electrode, and an alignment direction of the ninth liquid crystal alignment domain and an alignment direction of the tenth liquid crystal alignment domain point to an intersection point of the coupling electrode and the auxiliary electrode.

8. The pixel structure according to claim 7, wherein a dimension of the auxiliary electrode is greater than a half width of the third pixel electrode or is substantially equal to the width of the third pixel electrode.

9. The pixel structure according to claim 7, wherein the auxiliary electrode is located between the second scan line and the third pixel electrode.

10. The pixel structure according to claim 1, wherein an area of the first liquid crystal alignment domain, an area of the second liquid crystal alignment domain, an area of the third liquid crystal alignment domain, and an area of the fourth liquid crystal alignment domain are approximately the same.

11. The pixel structure according to claim 1, wherein the coupling electrode is overlapping a part of the first pixel electrode, a part of the second pixel electrode, and a part of the third pixel electrode to define a first overlapping region, and the capacitance electrode is overlapping another part of the first pixel electrode, another part of the second pixel electrode, and another part of the third pixel electrode to define a second overlapping region, wherein the first overlapping region and the second overlapping region do not overlap each other.

12. A pixel structure, comprising:
a first active device, wherein a source of the first active device is connected to a data line, and a gate of the first active device is connected to a first scan line;
a second active device, wherein a source of the second active device is electrically connected to the first active device, and a gate of the second active device is connected to a second scan line;
a first pixel electrode, connected to a first drain of the first active device, and having a plurality of first slits, wherein the first slits in four different alignment directions respectively define a first liquid crystal alignment domain, a second liquid crystal alignment domain, a third liquid crystal alignment domain, and a fourth liquid crystal alignment domain;
a second pixel electrode, having a plurality of second slits, wherein the second slits in the four different alignment directions respectively define a fifth liquid crystal alignment domain, a sixth liquid crystal alignment domain, a seventh liquid crystal alignment domain, and an eighth liquid crystal alignment domain;
a third pixel electrode, connected to a drain of the second active device, and having a plurality of third slits, wherein the third slits in only two different alignment directions respectively define a ninth liquid crystal alignment domain and a tenth liquid crystal alignment domain;
a coupling electrode, connected to a second drain of the first active device, the second pixel electrode, and the source of the second active device, wherein the coupling electrode is extended to pass through the first pixel electrode, the second pixel electrode, and the third pixel electrode, and the coupling electrode having a first overlapping region that is overlapping a first part of the first pixel electrode, a first part of the second pixel electrode, and a first part of the third pixel electrode; and
a capacitance electrode, having a second overlapping region that is overlapping another part of the first pixel electrode, another part of the second pixel electrode, and another part of the third pixel electrode, wherein the first overlapping region and the second overlapping region do not overlap each other.

13. The pixel structure according to claim 12, wherein the seventh liquid crystal alignment domain is located between the fifth liquid crystal alignment domain and the ninth liquid crystal alignment domain, and the eighth liquid crystal alignment domain is between the sixth liquid crystal alignment domain and the tenth liquid crystal alignment domain.

14. The pixel structure according to claim 13, wherein a total area of the fifth liquid crystal alignment domain and the ninth liquid crystal alignment domain is substantially equal to a total area of the sixth liquid crystal alignment domain and the tenth liquid crystal alignment domain.

15. The pixel structure according to claim 13, wherein a total area of the fifth liquid crystal alignment domain and the ninth liquid crystal alignment domain is substantially equal to an area of the seventh liquid crystal alignment domain, or a total area of the sixth liquid crystal alignment domain and the tenth liquid crystal alignment domain is substantially equal to an area of the eighth liquid crystal alignment domain.

16. The pixel structure according to claim 13, wherein an area of the seventh liquid crystal alignment domain and an area of the eighth liquid crystal alignment domain are substantially larger than an area of the fifth liquid crystal alignment domain and an area of the sixth liquid crystal alignment domain.

17. The pixel structure according to claim 12, wherein the first pixel electrode has a first trunk and a second trunk intersecting the first trunk for defining the first liquid crystal alignment domain, the second liquid crystal alignment domain, the third liquid crystal alignment domain, and the fourth liquid crystal alignment domain, and the first slits are disposed in the first liquid crystal alignment domain, the second liquid crystal alignment domain, the third liquid crystal alignment domain, and the fourth liquid crystal alignment domain, and the second pixel electrode has a third trunk and a fourth trunk intersecting the third trunk for defining the fifth liquid crystal alignment domain, the sixth liquid crystal alignment domain, the seventh liquid crystal alignment domain, and the eighth liquid crystal alignment domain, and the first slits are disposed in the fifth liquid crystal alignment domain, the sixth liquid crystal alignment domain, the seventh liquid crystal alignment domain, and the eighth liquid crystal alignment domain.

18. The pixel structure according to claim 12 further comprising an auxiliary electrode, wherein the auxiliary electrode is connected to the coupling electrode, and an alignment direction of the ninth liquid crystal alignment domain and an alignment direction of the tenth liquid crystal alignment domain point to an intersection point of the coupling electrode and the auxiliary electrode.

19. The pixel structure according to claim 18, wherein a dimension of the auxiliary electrode is greater than a half width of the third pixel electrode or is substantially equal to the width of the third pixel electrode.

20. The pixel structure according to claim 18, wherein the auxiliary electrode is located between the second scan line and the third pixel electrode.

21. The pixel structure according to claim 12, wherein an area of the first liquid crystal alignment domain, an area of the second liquid crystal alignment domain, an area of the third liquid crystal alignment domain, and an area of the fourth liquid crystal alignment domain are approximately the same.

22. A pixel structure, comprising:
a first active device, wherein a source of the first active device is connected to a data line, and a gate of the first active device is connected to a first scan line;
a second active device, wherein a source of the second active device is electrically connected to the first active device, and a gate of the second active device is connected to a second scan line;
a first pixel electrode, connected to a first drain of the first active device, and having a plurality of first slits, wherein the first slits in four different alignment directions respectively define a first liquid crystal alignment domain, a second liquid crystal alignment domain, a third liquid crystal alignment domain, and a fourth liquid crystal alignment domain;
a second pixel electrode, having a plurality of second slits, wherein the second slits in the four different alignment directions respectively define a fifth liquid crystal alignment domain, a sixth liquid crystal alignment domain, a seventh liquid crystal alignment domain, and an eighth liquid crystal alignment domain;
a third pixel electrode, connected to a drain of the second active device, and having a plurality of third slits, wherein the third slits in only two different alignment directions respectively define a ninth liquid crystal alignment domain and a tenth liquid crystal alignment domain;
a coupling electrode, connected to a second drain of the first active device, the second pixel electrode, and the source of the second active device, wherein the coupling electrode is extended to pass through the first pixel electrode, the second pixel electrode, and the third pixel electrode, and the coupling electrode is overlapping a part of the first pixel electrode, a part of the second pixel electrode, and a part of the third pixel electrode;
a capacitance electrode, respectively overlapping another part of the first pixel electrode, another part of the second pixel electrode, and another part of the third pixel electrode; and
an auxiliary electrode, wherein the auxiliary electrode is connected to the coupling electrode, and an alignment direction of the ninth liquid crystal alignment domain and an alignment direction of the tenth liquid crystal alignment domain point to an intersection point of the coupling electrode and the auxiliary electrode.

23. The pixel structure according to claim 22, wherein the seventh liquid crystal alignment domain is located between the fifth liquid crystal alignment domain and the ninth liquid crystal alignment domain, and the eighth liquid crystal alignment domain is between the sixth liquid crystal alignment domain and the tenth liquid crystal alignment domain.

24. The pixel structure according to claim 23, wherein a total area of the fifth liquid crystal alignment domain and the ninth liquid crystal alignment domain is substantially equal to a total area of the sixth liquid crystal alignment domain and the tenth liquid crystal alignment domain.

25. The pixel structure according to claim 23, wherein a total area of the fifth liquid crystal alignment domain and the ninth liquid crystal alignment domain is substantially equal to an area of the seventh liquid crystal alignment domain, or a total area of the sixth liquid crystal alignment domain and the tenth liquid crystal alignment domain is substantially equal to an area of the eighth liquid crystal alignment domain.

26. The pixel structure according to claim 23, wherein an area of the seventh liquid crystal alignment domain and an area of the eighth liquid crystal alignment domain are substantially larger than an area of the fifth liquid crystal alignment domain and an area of the sixth liquid crystal alignment domain.

27. The pixel structure according to claim 22, wherein the first pixel electrode has a first trunk and a second trunk intersecting the first trunk for defining the first liquid crystal alignment domain, the second liquid crystal alignment domain, the third liquid crystal alignment domain, and the fourth liquid crystal alignment domain, and the first slits are disposed in the first liquid crystal alignment domain, the second liquid crystal alignment domain, the third liquid crystal alignment domain, and the fourth liquid crystal alignment domain, and the second pixel electrode has a third trunk and a fourth trunk intersecting the third trunk for defining the fifth liquid crystal alignment domain, the sixth liquid crystal alignment domain, the seventh liquid crystal alignment domain, and the eighth liquid crystal alignment domain, and the first slits are disposed in the fifth liquid crystal alignment domain, the sixth liquid crystal alignment domain, the seventh liquid crystal alignment domain, and the eighth liquid crystal alignment domain.

28. The pixel structure according to claim 22, wherein the coupling electrode is overlapping a part of the first pixel electrode, a part of the second pixel electrode, and a part of the third pixel electrode to define a first overlapping region, and the capacitance electrode is overlapping another part of the first pixel electrode, another part of the second pixel electrode, and another part of the third pixel electrode to define a second overlapping region, wherein the first overlapping region and the second overlapping region do not overlap each other.

29. The pixel structure according to claim 22, wherein a dimension of the auxiliary electrode is greater than a half width of the third pixel electrode or is substantially equal to the width of the third pixel electrode.

30. The pixel structure according to claim 22, wherein the auxiliary electrode is located between the second scan line and the third pixel electrode.

31. The pixel structure according to claim 22, wherein an area of the first liquid crystal alignment domain, an area of the second liquid crystal alignment domain, an area of the third liquid crystal alignment domain, and an area of the fourth liquid crystal alignment domain are approximately the same.

\* \* \* \* \*